United States Patent
Cirihal

(10) Patent No.: US 10,346,898 B2
(45) Date of Patent: Jul. 9, 2019

(54) ELECTRONIC PURCHASED PART ORDER DATA MANAGEMENT SYSTEM AND METHOD

(71) Applicant: American Axle & Manufacturing, Inc., Detroit, MI (US)

(72) Inventor: Ronaldo Bittencourt Cirihal, Commerce Township, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 716 days.

(21) Appl. No.: 14/062,126

(22) Filed: Oct. 24, 2013

(65) Prior Publication Data

US 2015/0120366 A1    Apr. 30, 2015

(51) Int. Cl.
  *G06Q 10/06* (2012.01)
  *G06Q 30/06* (2012.01)

(52) U.S. Cl.
  CPC ... *G06Q 30/0637* (2013.01); *G06Q 10/06315* (2013.01)

(58) Field of Classification Search
  CPC ....... G06Q 10/06315; G06Q 10/06316; G06Q 10/0635; G06Q 10/0637; G06Q 10/0631; G06Q 30/0637; G06F 17/3056
  See application file for complete search history.

(56) References Cited

U.S. PATENT DOCUMENTS

| | | | | |
|---|---|---|---|---|
| 5,960,411 A * | 9/1999 | Hartman | ............... | G06Q 10/087 705/26.8 |
| 5,983,195 A * | 11/1999 | Fierro | ................... | G06Q 10/04 705/7.22 |
| 6,763,335 B1 * | 7/2004 | Nanbu | ................... | G06Q 30/06 705/26.82 |
| 6,889,106 B2 * | 5/2005 | Wei | ................... | G06Q 10/0631 700/100 |
| 7,596,510 B2 * | 9/2009 | Fisher | ............ | G06Q 10/063114 705/26.8 |

(Continued)

OTHER PUBLICATIONS

Non-Patent Literature, Google Patents Search Apr. 15, 2019.*
Non-Patent Literature, Google Scholar Search Apr. 15, 2019.*

*Primary Examiner* — Tyler W Knox
(74) *Attorney, Agent, or Firm* — Harness, Dickey & Pierce, P.L.C.

(57) ABSTRACT

The computer-implemented purchased part order data management system employs a database management computer hosting a purchased part order database and an automated data collection and review computer communicating with the database management computer. The data collection and review computer has a purchased part order data (PPOD) repository and a messaging system that includes a message routing data structure. Through an interface, a user interacts with the data collection and review system to add PPOD information, which is then made available to other users for review. The data collection and review computer records the status of the PPOD as it undergoes the review process and mediates which party is next invited to review the PPOD information. Once finally reviewed, the automated data collection and review computer issues a prompt to the database management computer to ingest information based on the PPOD.

20 Claims, 12 Drawing Sheets

(56) References Cited

U.S. PATENT DOCUMENTS

| | | | | |
|---|---|---|---|---|
| 7,660,742 B2* | 2/2010 | Biwer | ............... | G06Q 30/0637 |
| | | | | 705/26.82 |
| 7,668,782 B1* | 2/2010 | Reistad | ................. | G06Q 30/06 |
| | | | | 705/50 |
| 7,693,749 B2* | 4/2010 | Wittmer | ............ | G06Q 30/0633 |
| | | | | 705/26.8 |
| 7,716,077 B1* | 5/2010 | Mikurak | ............... | G06Q 10/06 |
| | | | | 705/7.12 |
| 7,805,335 B2* | 9/2010 | Wittmer | ............ | G06Q 10/0875 |
| | | | | 705/26.1 |
| 7,962,377 B2* | 6/2011 | Grendel | ............ | G06Q 30/0637 |
| | | | | 705/26.81 |
| 2002/0120533 A1* | 8/2002 | Wiesenmaier | ..... | G06Q 10/0631 |
| | | | | 705/7.12 |
| 2002/0133470 A1* | 9/2002 | Gruber | ............... | G06Q 10/087 |
| | | | | 705/76 |
| 2002/0188486 A1* | 12/2002 | Gil | ........................ | G06Q 10/06 |
| | | | | 705/7.12 |
| 2004/0143504 A1* | 7/2004 | Tsai | .................... | G06Q 10/087 |
| | | | | 705/16 |
| 2006/0178918 A1* | 8/2006 | Mikurak | ............... | G06Q 10/06 |
| | | | | 705/7.25 |
| 2008/0120129 A1* | 5/2008 | Seubert et al. | ................... | 705/1 |
| 2010/0169143 A1* | 7/2010 | Carr | ................... | G06Q 10/0631 |
| | | | | 705/7.21 |
| 2011/0153624 A1* | 6/2011 | Aigner | ................ | G06F 16/252 |
| | | | | 707/754 |
| 2011/0258083 A1* | 10/2011 | Ren | ..................... | G06Q 10/087 |
| | | | | 705/27.1 |
| 2014/0040077 A1* | 2/2014 | Livesay | ................ | G06Q 10/06 |
| | | | | 705/26.82 |

* cited by examiner

| PPOD Status | Approval Status | Action |
|---|---|---|
| Draft | | PPOD Saved |
| Submitted | Pending Approval | PPOD Submitted for Approval |
| Submitted to EBS | Approved | Finally Approved |
| Draft | Rejected | Rejected by Approver |
| Draft | Rejected | Buyer Modified the PPOD after approver rejected and saved |
| Submitted | Pending Approval | Buyer Modified the PPOD and Resubmitted for Approval |
| Cancelled | Rejected | Buyer Cancelled the PPOD |
| Error | Approved | Error in the interface |
| Submitted to EBS | Approved | Buyer Modified the PPOD and submitted |
| Completed | Approved | Succesfully Created in EBS |

Fig. 7

ELECTRONIC PURCHASED PART ORDER DATA MANAGEMENT SYSTEM AND METHOD

FIELD

The present disclosure relates generally to database systems for managing industrial processes. More particularly the disclosure relates to procurement systems for handling production purchase order data (P POD) in an automated fashion.

BACKGROUND

This section provides background information related to the present disclosure which is not necessarily prior art.

In the automotive industry, for example, many thousands of different mass produced parts are furnished to the automobile manufacturer from a plurality of first-tier and second-tier suppliers. The automobile manufacturer will typically require each supplier to conform to its purchase order protocols, which dictate how parts of a specific designation are pulled into the supply chain as needed. While the automobile manufacturer has a great deal of control over the supply chain, each individual supplier still maintains some control and flexibility as to how parts are engineered, manufactured and supplied pursuant to the automobile manufacturer's required specifications.

The automotive industry prides itself on continuously improving not only the products it manufactures but also the process by which those products are manufactured. However, because the automotive vehicle is so complex, there can be literally thousands of improvements pending at any given time. Some of these improvements find their way into a current model year production; other improvements may be deferred until a later model year. The approval process is often quite complex, with many different review entities each providing a different level of approval before the improved part can be released for production.

Networked computer systems are used today to mediate the way parts are manufactured and supplied to the automobile manufacturer. Each supplier that deals directly with the automobile manufacturer typically employs a computer-implemented database system that maintains a record of all parts that are approved for production. This database system may be configured to communicate directly with a counterpart computer-implemented database system at the automobile manufacturer. In other cases inter-company communication is effected using paper documents and/or telephone. When changes are made to a part, either at the request of the automobile manufacturer (as customer) or by the part manufacturer (as supplier) these respective database systems are synchronized through the applicable communication channel, so that both sides will have current information.

The database system is a key component of just-in-time manufacturing, as the information stored in the database controls how parts orders are fulfilled. In conventional practice, when changes need to be made to the data stored in the database, to update the purchase order to current pricing and other conditions, the information required to be changed is first manually curated through various levels of an company-internal approval processes. Only after all approvals have been given can the record in the database be updated. In other words, during the approval process, which can be lengthy and involved, the information stored in the database represents the state of the purchase order as it existed before the current changes were developed. This can cause problems for businesses, especially where pricing changes or other important specifications can occur frequently.

SUMMARY

This section provides a general summary of the disclosure, and is not a comprehensive disclosure of its full scope or all of its features.

The disclosed system addresses the above concern by eliminating the manual approval process with an automated one. In one aspect, the computer-implemented purchased part order data management system comprises a database management computer hosting a purchased part order database and an automated data collection and review computer. The automated data collection and review computer has a purchased part order data (PPOD) repository and a computer-implemented messaging system including a message routing data structure. The automated data collection and review system is coupled to said database management computer to support data transfer from the automated data collection and review system to the database management system. The automated data collection and review system further includes an interface supporting interaction with the data repository and with the messaging system by a PPOD creating user and by a plurality of different PPOD reviewing users. Populated in the message routing data structure, the messaging system stores the identity of different PPOD reviewing users according to a predefined reviewing sequence. The messaging system automatically monitors interaction by said PPOD creating user and by said PPOD reviewing users and issues prompts to PPOD reviewing users based on the predefined reviewing sequence. The messaging system issues a prompt to the database management computer to ingest information based on the PPOD data when, based on the predefined reviewing sequence, all pending reviews have been completed with approval.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 7 is a status matrix describing how the automated data collection and review system records the state of a PPOD;

Corresponding reference numerals indicate corresponding parts throughout the several views of the drawings.

DESCRIPTION OF PREFERRED EMBODIMENTS

Example embodiments will now be described more fully with reference to the accompanying drawings.

Figure 1A:
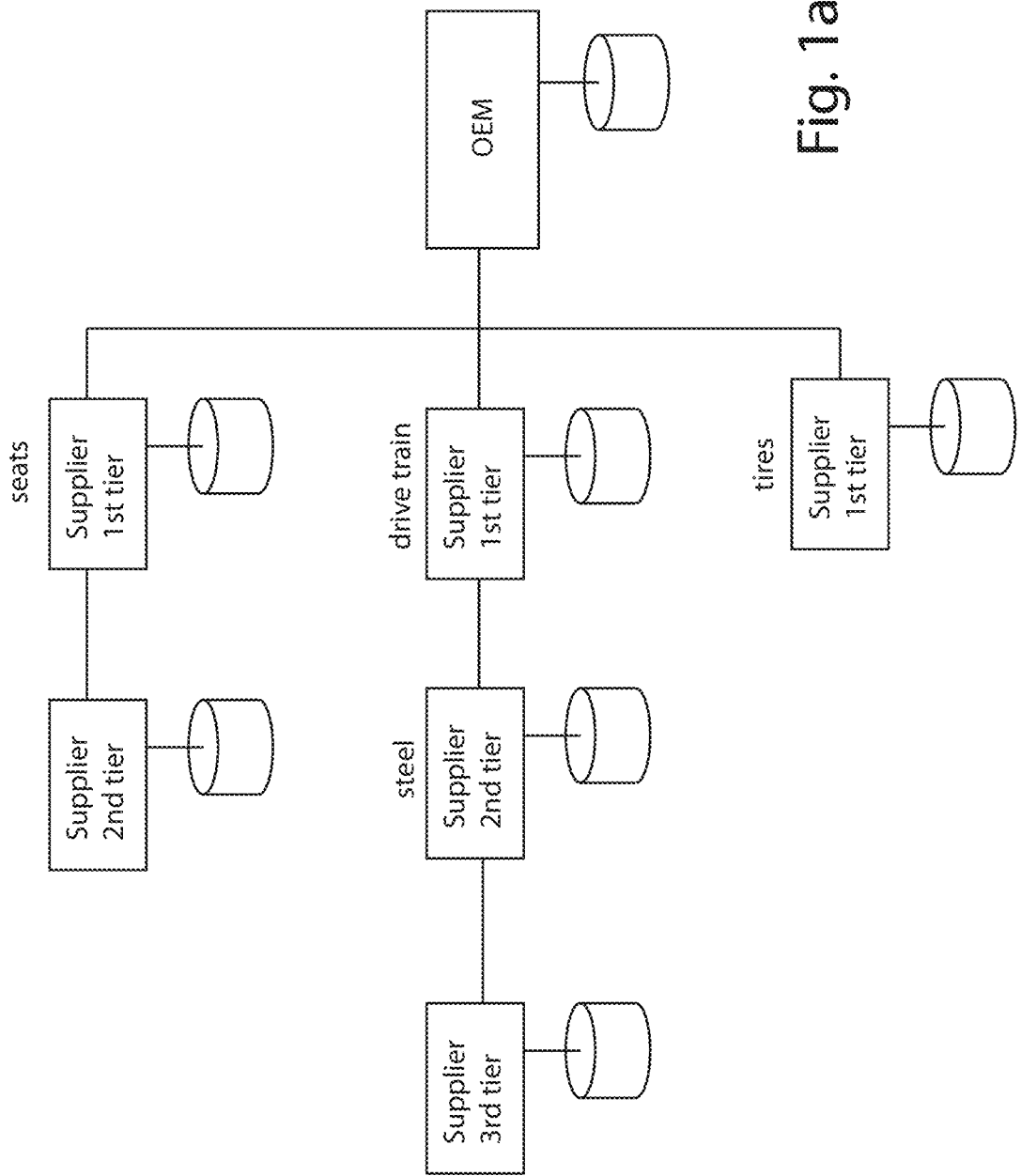
FIG. 1a is a networked computer system diagram showing an exemplary network of suppliers, at different tiers, communicating with a product manufacturer.

Referring to FIG. 1a, an exemplary manufacturing supply chain has been illustrated. The original equipment manufacturer (OEM) obtains components needed to assemble the final product from the first tier suppliers, which in turn obtain the components needed to manufacture their products from second tier suppliers, which may obtain raw materials from third tier suppliers.

To better control costs and throughput, the so called "lean," "flexible" or "just-in-time" manufacturing process dictates that each tier should be primed to respond promptly to pull requests from its customer in the tier above. Rather than stockpiling large quantities of parts based on expected projections, the suppliers run lean and manufacture parts as they are actually called for by the tier above. This means that suppliers at all levels must run very efficient operations. Moreover, the suppliers at all levels need to have good communication systems and integrated business systems, to allow the supplier to act promptly when parts are requested from the tier above.

Figure 1B:
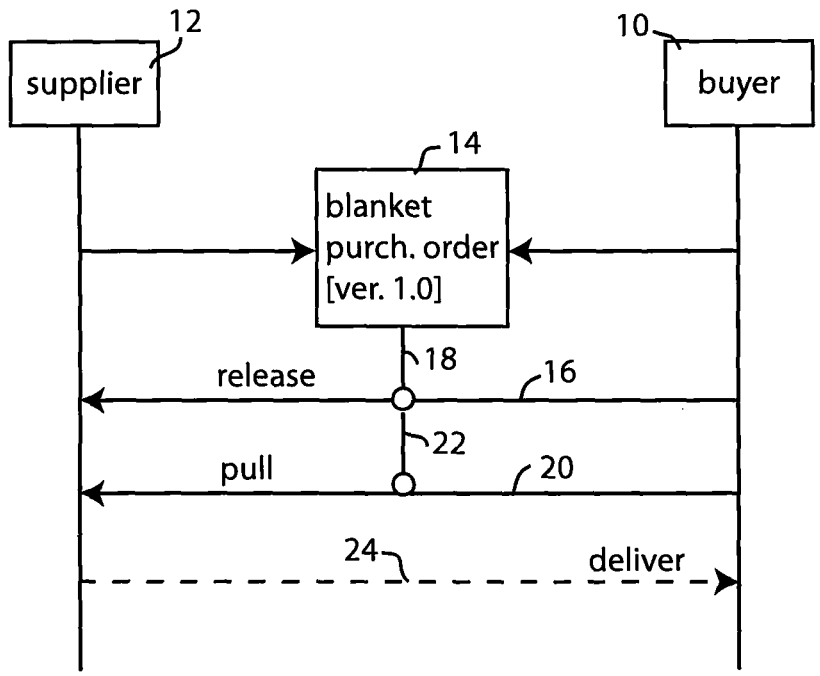
FIG. 1b is a sequence diagram illustrating the operation of a blanket purchase order just-in-time relationship, useful in understanding the data management system and method.

At any given level of the supply chain, one party acts as the buyer and the party at the tier below acts as the supplier. Typically buyer and seller will have a negotiated agreement between them that dictates the basic terms, including price, under which products or services will be delivered. Conventionally, the buyer and seller might enter into what is called a blanket purchase order which functions as illustrated in FIG. 1b. The buyer 10 and supplier 12 enter into a blanket purchase order 14 which may be subject to subsequent revision as will be discussed in connection with FIG. 1c. The blanket purchase order 14 states the contractual terms whereby the supplier will deliver goods or services to the buyer.

To implement the just-in-time process, the supplier does not actually manufacture and deliver product until it receives a "signal" from the buyer in the form of a release 16, The release is effectively "tied" to the blanket purchase order 14 and serves to authorize the supplier to manufacture a given number of goods or perform a given quantity of services under the extant terms of the blanket purchase order. In Figure 1b the release 16 is tied to the blanket purchase order 14 as symbolically shown at 18. The supplier does not actually deliver products or services (as at 24) until the buyer sends a subsequent pull signal 20, which is also tied at 22 to the blanket purchase order 14. Upon receiving the pull signal the supplier then delivers the product or service specified by the pull signal.

According to the just-in-time process the quantity of product or service covered by the release signal or message is typically larger than the quantity covered by the pull signal or message. For example, a buyer might authorize the supplier to manufacture 2000 units of product, but to hold those in the supplier's warehouse until receiving a pull signal or message, which might for example request delivery of 500 units per week. Thus the buyer receives product just in time for its needs while funding enough manufacturing in advance of the need to support the supplier's business needs.

The just-in-time process breaks down, however, when the terms of the blanket purchase order need to be revised by renegotiation. Such revision might happen hundreds or thousands of times a year as prices for raw materials or other commodities change. When a change to the blanket purchase order needs to be made, both parties will often need to get departmental approvals and make changes to their respective records, during which time the previous blanket purchase order will need to be suspended or placed on hold. This has been illustrated in FIG. 1c.

Figure 1C:
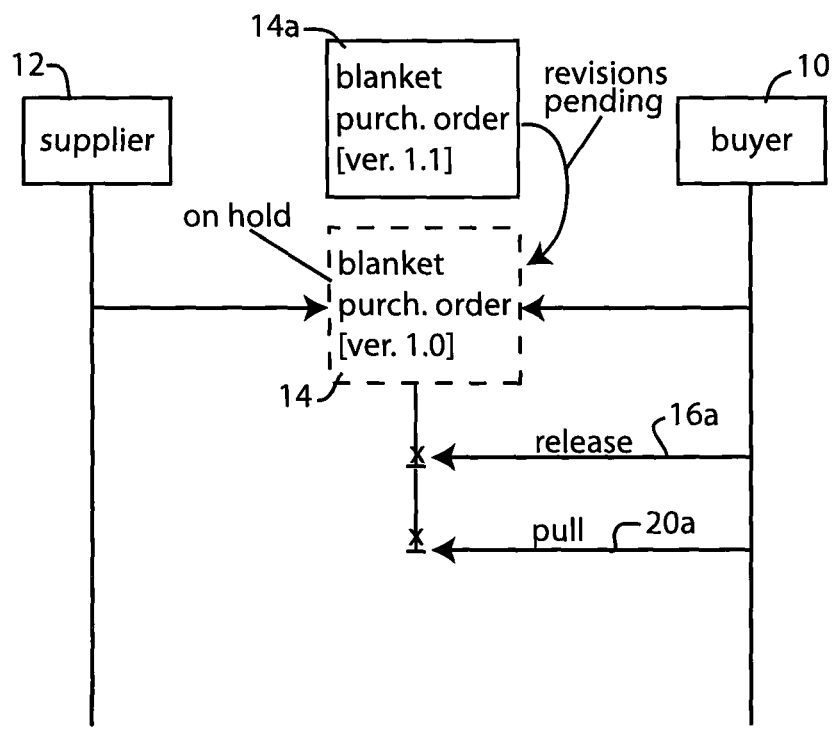
FIG. 1c is a sequence diagram illustrating the just-in-time relationship where the blanket purchase order is placed on hold, useful in understanding the data management system and method.

FIG. 1c shows the blanket purchase order 14 being placed on hold while the terms of replacement blanket purchase order 14a are being negotiated. So long as revisions are pending in the replacement blanket purchase order, it cannot be used to support the just-in-time process. Unfortunately, because the original blanket purchase order 14 has been placed on hold, it cannot be used to support the just-in-time process either. Thus when the buyer issues a release, as at 16a, or when the buyer issues a pull, as at 20a, there is no live blanket purchase order to support these transactions, and thus the buyer's just-in-time purchase order management system will not permit these to be conveyed to the supplier. Effectively manufacturing and delivery must stop until all of the details of the new blanket purchase order 14a are worked out, and this can often take considerable time because many approvals and many record updating procedures are typically required.

Figure 2:
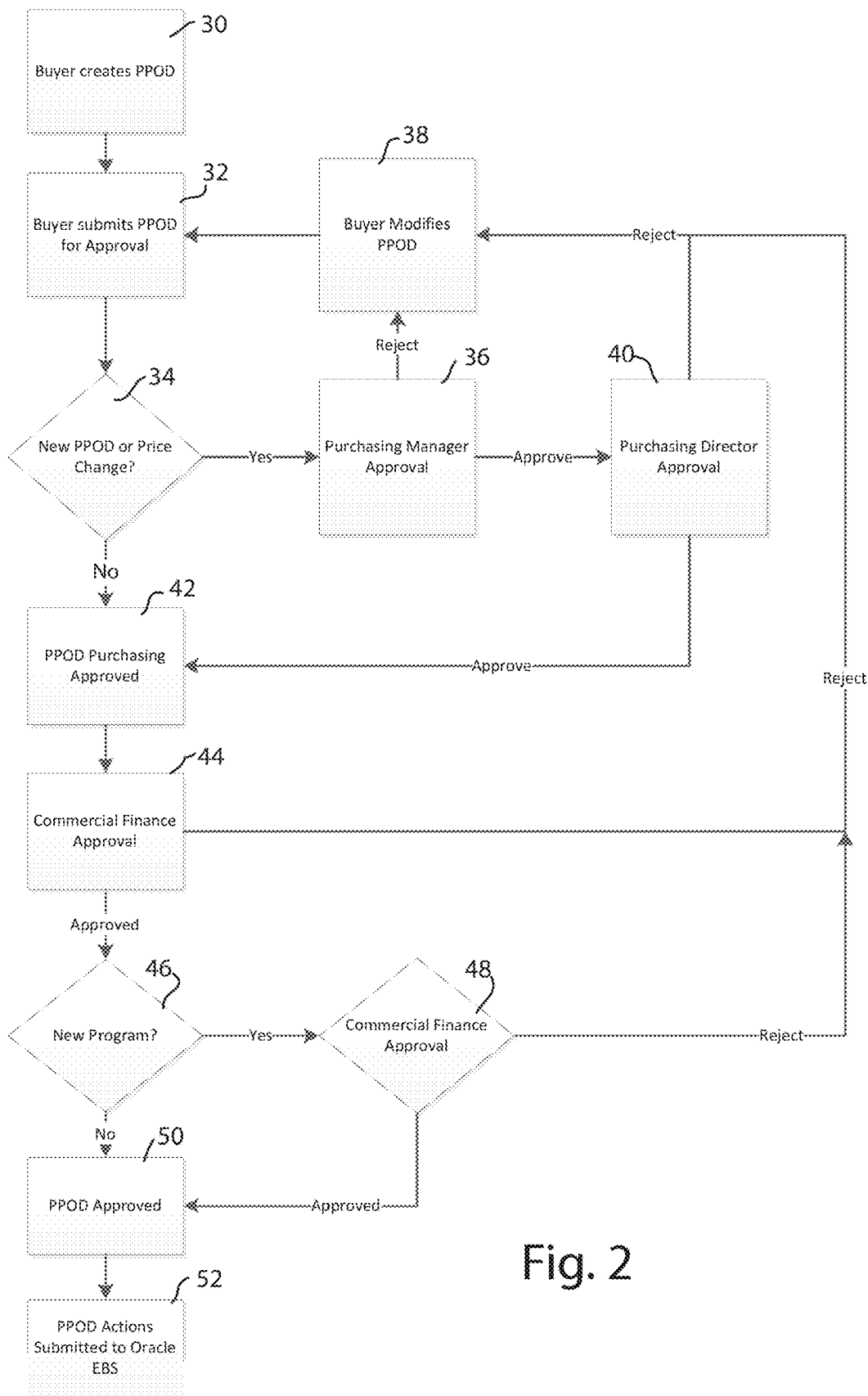
FIG. 2 is a sequence diagram illustrating a prior art technique for processing production purchase order data (PPOD)

FIG. 2 describes a typical workflow by which a blanket purchase order 14 is updated. It will be appreciated that this workflow is just an example. Many variations are possible. The process begins at step 30 with a person, acting on behalf of the buyer 10, recording production purchase order data (PPOD) into a document, herein referred to as the PPOD document. The buyer, at step 32, submits the PPOD document to an internal reviewing organization for approval. As part of the internal reviewing process the reviewing organization determines at step 34 whether the PPOD document represents a new PPOD or a price change. If so, the additional review steps at 36, 38 and 40 are performed. If not, the review process proceeds to step 42. More specifically, when creating a PPOD, the buyer specifies whether it is for a PO modification or creation of a new PO. Preferably, a price change is always done via a PO modification.

If the PPOD represents a new document or price change, a purchasing manager must approve at step 36. If approval is denied, the buyer must modify the PPOD at step 38. If approval is granted, the PPOD must next be approved by the purchasing director at step 40. If the director refuses to grant approval, the buyer must modify the PPOD at step 38; otherwise if the director grants approval, the process branches to step 42.

At step 42, the PPOD is deemed approved by the purchasing department. However, additional approvals are still needed. Thus at step 44, the PPOD must be granted approval by the commercial finance department. Failure to receive such approval returns the PPOD to step 38. If commercial finance approval is granted, the process next determines, at step 46, if the PPOD represents a new program. If so, additional commercial finance approval is required at step 48. Failure to receive such additional approval returns the PPOD to step 38.

Once the additional commercial finance approval is granted, if required, the PPOD is deemed "approved," at step 50. At this point the data contained within the PPOD document can be input into the buyer's database, at step 52, updating any existing blanket purchase order record, or creating a new one as the case may be.

Figure 3:
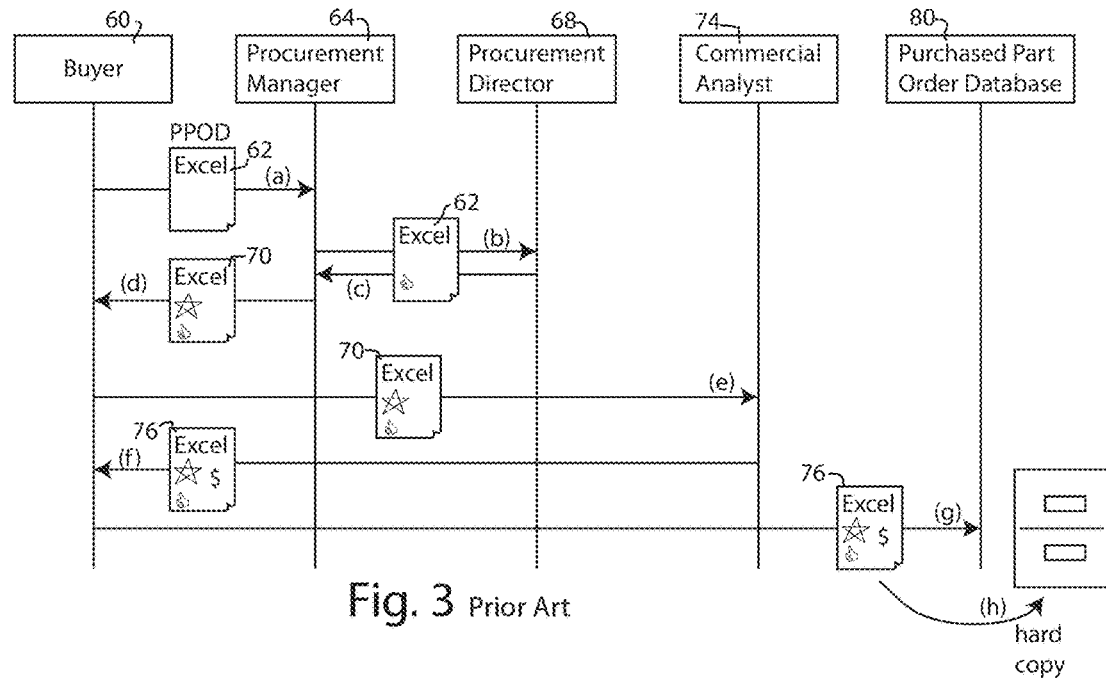
FIG. 3 is a sequence diagram illustrating the technique for processing production purchase order data (PPOD) according to the present disclosure.

FIG. 3 shows the conventional way in which the process described in FIG. 2 is carried out. The process relies on a printed PPOD document, as will be described.

The conventional process begins with a person in the role of buyer 60 generating a PPOD document 62, as in the form of an EXCEL® spreadsheet, containing the purchased part order data (PPOD) corresponding either to a new part order, or a modification of an existing part order. At this stage the PPOD data is not stored in the purchased part order database 80. A number of internal approvals are required first.

To obtain these approvals using the conventional process, the buyer 60 forwards a paper copy of PPOD document 62 (as at a) to the procurement manager 64, who reviews the document and may further forward (as at b) it to the procurement director 68 to obtain approval from the director. The director's approval is affixed to the document and returned (as at c) to the manager 64, who affixes the procurement department approval on the document, designated at 70, and then returns it (as at d) to the buyer 60. The buyer 60 then forwards the approved document 70 (as at e) to the commercial analyst 74, who reviews and affixes the commercial approval to the document as at 76 and returns it to the buyer 60 (as at f). Finally the buyer 60, having obtained all of the necessary approvals, enters the data from the fully approved PPOD document 76 into the purchase part order database 80 (as at g). This is done by re-keying the information into the database using a computer terminal attached to the computer system managing the database 80. A hard copy of the fully approved PPOD document 76 is then transferred (as at h) to a file cabinet or scanned electronic storage device 82. To perform this task the operator will typically take somewhat less than an hour and sometimes several hours to perform the PO updates.

Once entered into the purchased part order database 80, the new information is now made available for company-wide use as a newly created or revised blanket purchase order. To make this information available a second job is run on the computer system, tying releases and product pulls for a given part to the correct purchase order. These are referred to as "sourcing rules." Releases and pulls effectively sit in "limbo" when sourcing rules are not established. Without PPOD, sourcing rules have to be established manually and tend to be sometimes forgotten, since there is nothing reminding a buyer or a clerk of that step. PPOD invokes and/or creates sourcing rules automatically. This is another benefit of the disclosed system.

From FIG. 3 it will be appreciated that the PPOD document generation and approval process has many potentially time consuming steps. At each step there is a possibility for human error or omission. Even after the entire approval process is complete, there is still the possibility for human error in re-keying the information from the PPOD document into the purchase part order database 80.

Figure 4:
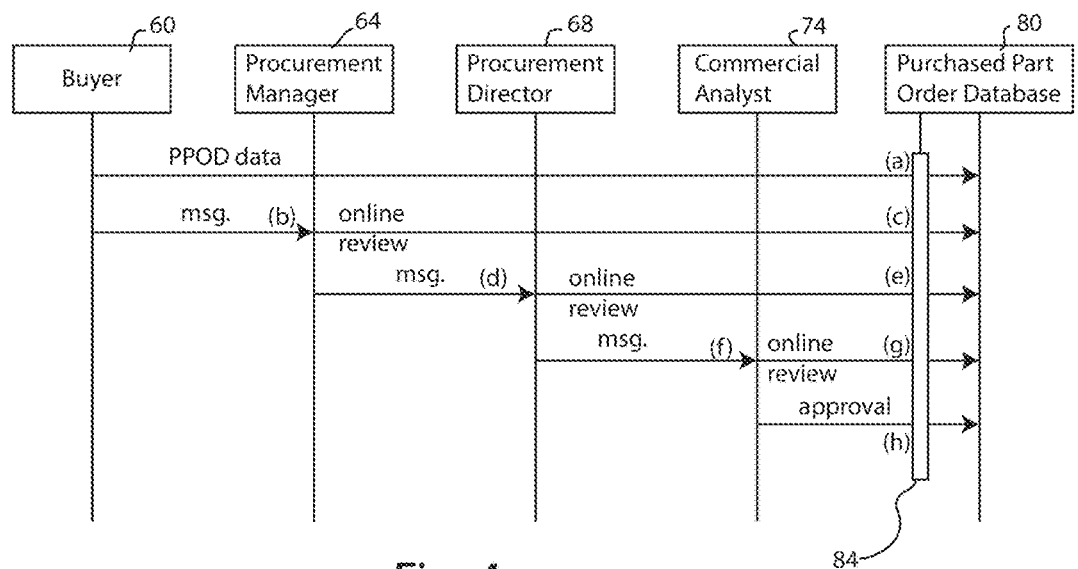
FIG. 4 is a high level computer architecture diagram illustrating an embodiment of the disclosed system.

FIG. 4 gives an overview of the improved process according to the present disclosure. The improved system employs an automated data collection and review system 84 that operates upstream of the purchase part order database 80. The PPOD data are entered into this data collection and review system 84 and then simple messages are sent to the different creating and reviewing entities, notifying them to perform their respective review and enter the appropriate approvals. Thus as illustrated, the buyer 60 enters the PPOD data into the automated data collection and review system 84 (as at a). When this has been done, the buyer 60 notifies the procurement manager 64 (as at b) via a messaging system associated with system 84, prompting the procurement manager to perform an online review of the PPOD data (as at c). Once this has been completed, the procurement manager 64 sends a message (as at d) to the procurement director 68, who then conducts a further review (as at e). Once the director's review is complete, the director sends a message (as at f) notifying the commercial analyst 74 to conduct a financial review (as at g). Once financial approval is granted, the commercial analyst 74 sends a final message to the system 84 (as at h) notifying the system 84 that the PPOD data is now fully approved, whereupon the automated data collection and review system 84 directly enters the data into database 80 without the need for re-keying by a human operator. Thus the automated data collection and review system 84 largely eliminates data discrepancy between the PPOD documents and the records stored in the database 80. The system also eliminates purchase orders from being unavailable for releases and/or pulls while updates are performed. With the use of the PPOD, there is always a blanket purchase order available for releases and pulls. When the PPOD for the PO revision is finally approved, the PO is updated in a matter of minutes, eliminating the chance for pulls or releases to sit waiting on an approved purchase order and associated sourcing rules.

Figure 5:
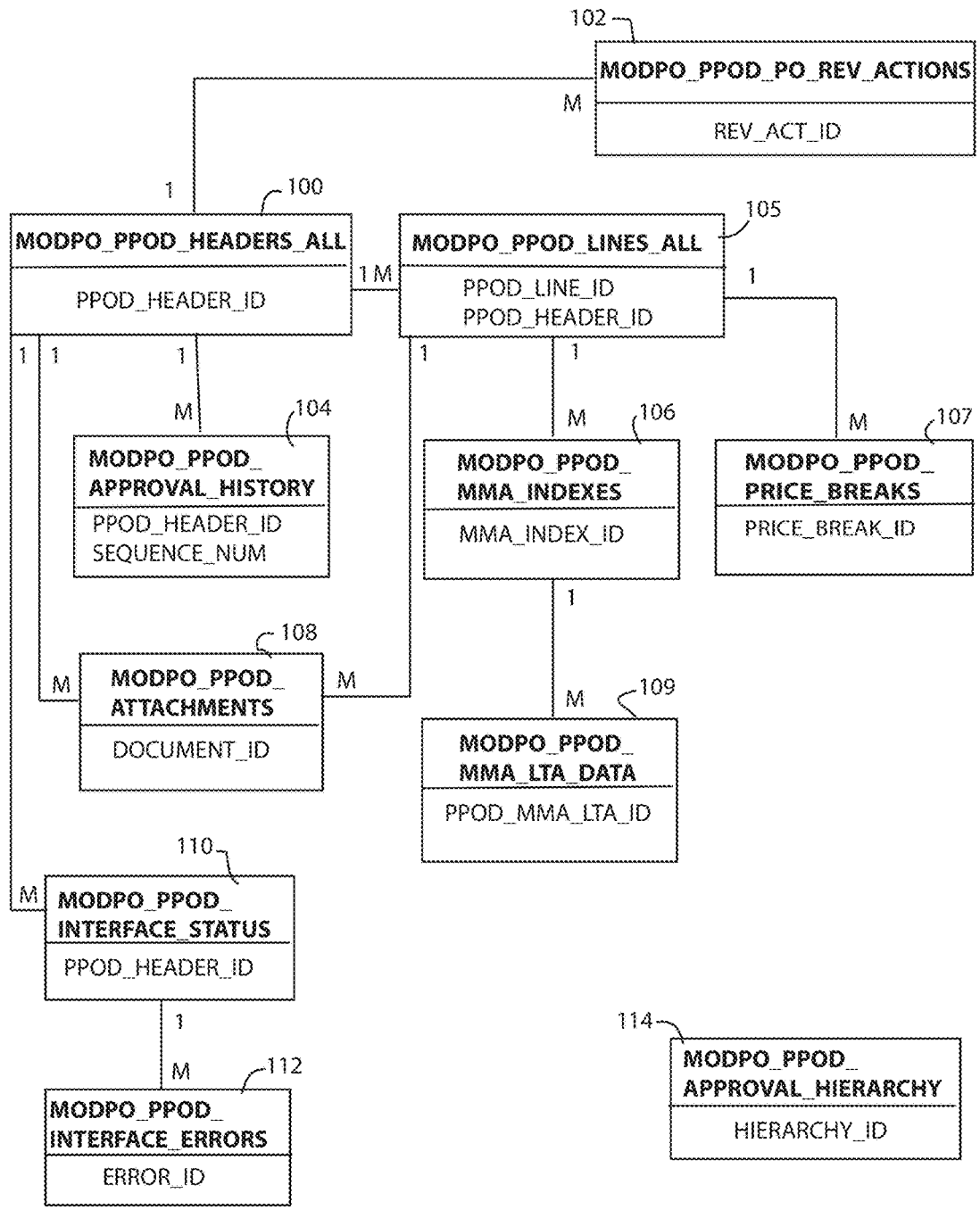
FIG. 5 is a high level database schema diagram illustrating a PPOD data model according to the present disclosure.

In an embodiment where the purchase part order database 80 is implemented using a relational database, such as an ORACLE® EBusiness Suite database, the automated data collection and review system 84 may be implemented using web technology, such as using the ORACLE® APEX framework. FIG. 5 illustrates the PPOD data model design for implementing an exemplary automated data collection and review system 84. In FIG. 5 the relations among data elements have been designated with 1 . . M designations, showing how the one-to-many relationships are defined. For illustration purposes, the schema illustrated in FIG. 5 has been customized to support a manufacturing business where raw materials, such as metals, can be expected to experience market pricing adjustments. Thus the schema has specific entities for storing data representing such "metal market adjustments" or MMA.

As illustrated, the PPOD data model stores a header record 100 to which plural records of the following types are associated via the one-to-many structural relationships:
Review Actions 102,
Approval History 104, Product lines 105,
Attachments 108, and
Interface Status 110.

The Interface Status entity 110, in turn, defines a one-to-many relationship with an Interface Errors structure 112.

For each product line 105, the schema defines the following one-to-many structural relationships:
Metal Market Adjustment (MMA) Indexes 106 and
Price Breaks 107.

The MMA Indexes each, in turn, have a one-to-many relationship with an entity for storing long term agreement (LTA) information, designated as LTA Data 109.

In addition to these data elements, the schema also defines an Approval Hierarchy structure 114.

Figure 6:
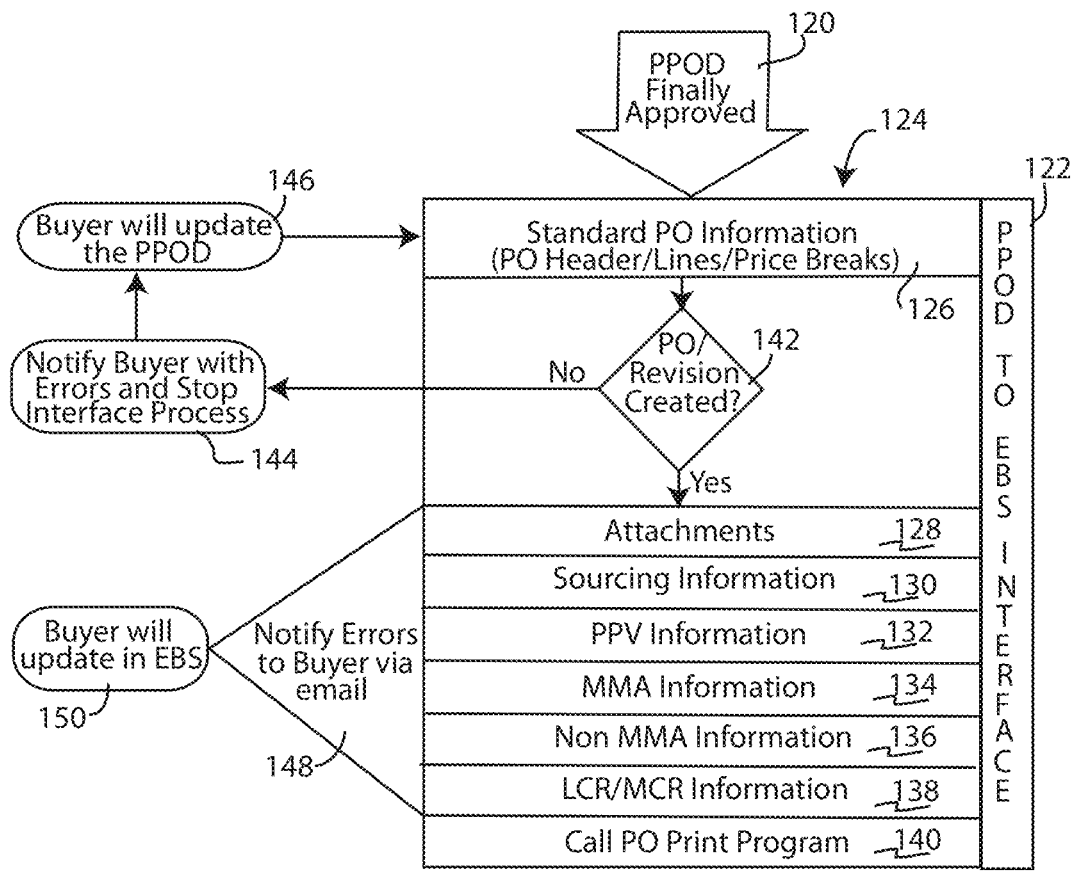
FIG. 6 is an interface process diagram illustrating how the computer-implemented system performs the PPOD information in stepwise fashion.

FIG. 6 shows the manner in which the automated data collection and review system 84 is interfaced with the database 80. Once the PPOD is finally approved (step 120), the automated data collection and review system 84 will automatically validate and process the PPOD using the interface shown in FIG. 6. In General the system 84 automatically enter the collected data into the database 80, as at step 122. This will generally include the validating and input of the various data elements shown at 124, which include:
Standard purchase order (PO) information, such as PO header, Lines, Price Breaks (shown at 126);
Attachments 128;
Sourcing Information 130;
Purchase price variance (PPV) information 132;
Metal market adjustment information 134;
Non-metal market adjustment information 136; and
Lean capacity rate (LCR) and maximum capacity rate (MCR) information 138.

In addition, the automated data collection and review system is configured, as shown at 140, to automatically call the purchase order (PO) print program.

As these listed data elements are processed, the automated data collection and review system 84 will automatically field and respond appropriately to any errors generated by the database 80, or any errors detected during validation. First the standard purchase order/revision information is processed using the standard PO information 126. Once the purchase order or revision is successfully created in the database 80 (e.g., created in the EBusiness Suite database) the corresponding custom information (data elements 128-138) will be processed.

If the attempt to create or revise the standard purchase order in database 80 fails with errors, the buyer is notified at step 144 and the buyer can then update the PPOD record as at 146, whereupon the PPOD is resubmitted. If any of the custom information is not successfully processed, the buyer is notified as at 148, whereupon the buyer can make the appropriate correction directly in database 80 (e.g., directly in the EBusiness Suite database).

Thus it is seen that the automated data collection and review system is configured to iteratively process certain information (standard PO information) until errors are eliminated; whereas other information (custom information) is simply input into the database 80 without iteration, allowing the buyer to make corrections in the database 80 directly. This bifurcated data validation technique ensures that all standard information is fully validated before the database 80 is updated, thus ensuring a fully formed record is always stored in the database. Other custom information that is not critical for defining a fully formed record is permitted to be written to database 80, so as not to delay the business process. Nevertheless the automated data collection and review system 84 notifies the buyer of any errors detected during validation, so that they can be corrected in due course. Until the PPOD is successfully processed and the PO updated, the prior version of the PO continues to serve as the contract, allowing the EBS system to send releases and pulls and allowing the supplier to see and fulfill them.

FIG. 7 shows the status matrix by which the automated data collection and review system 84 indicates the state of a PPOD. In the preferred implementation a new purchase order has two status attributes: the "PPOD Status" and the "Approval Status." Depending on the state of these attributes, different actions are signaled by the system 84, as shown in FIG. 7.

PPOD Status Attributes

In FIG. 7, the attribute "Draft" is applied when the buyer has entered the information and saved the information in the automated data collection and review system 84, but has not yet submitted it. The PPOD will have this status when the PPOD is rejected during the approval process.

The "Submitted" attribute is applied by the system 84 when the buyer has submitted a PPOD for approval.

The "Cancelled" attribute is applied by the system 84 when the buyer cancels the PPOD after it is rejected in the approval process.

The "Submitted to EBS" attribute is applied by the system 84 when the PPOD is finally approved and is currently undergoing the interface process by which the data are validated and entered into the database 80 (e.g., entered into the EBusiness Suite database).

The "Error" attribute is applied by the system 84 when an error is generated during the validation and entry of the PPOD data into the database 80.

The "Completed" attribute is applied by the system 84 when the purchase order has been successfully created in the database 80 (e.g., created in the EBusiness Suite) and the purchase order number has been linked to the PPOD.

PPOD Approval Status Attributes

In addition to setting the PPOD Status Attributes, discussed above, the system 84 also sets and maintains the PPOD Approval Status Attributes, which may have the following states.

The "Pending Approval" attribute indicates that the buyer has submitted the PPOD for approval.

The "Approved" attribute indicates that the PPOD is finally approved, but has not yet undergone the interfacing process whereby the data are validated and input into the database 80.

The "Rejected" attribute indicates that the PPOD was rejected by any approver in the approval hierarchy.

Figure 8:
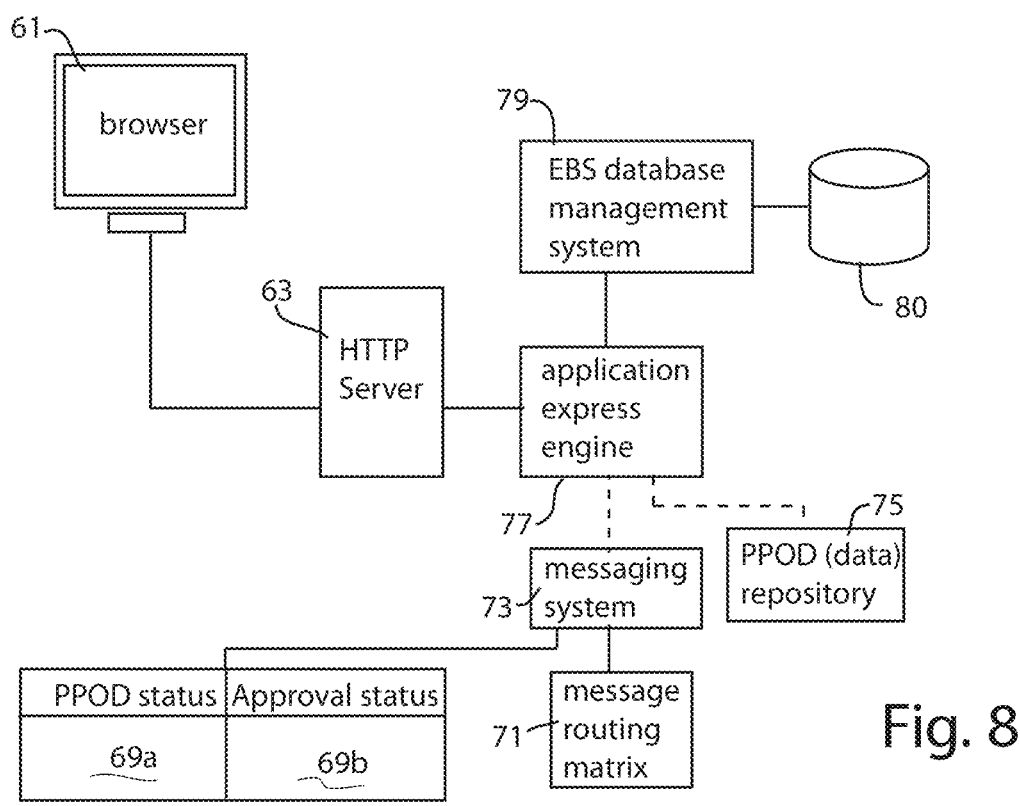
FIG. 8 is a computer hardware diagram illustrating one embodiment of how the PPOD management system is configured.

FIG. 8 shows one embodiment of how the PROD management system may be configured. As illustrated, the database 80 is supported by a database management system 79, such as the ORACLE® database management system with E-business suite (EBS). Attached via network connection to the database management system 79 is a computer running an application express engine 77, such as the ORACLE® Application Express (APEX) engine. This engine 77 communicates via a suitable web server or HTTP Server 63 to the buyer's computer running a suitable browser application 61.

The application express engine 77 is a computer that implements the automated data collection and review system 84 (FIG. 4). It includes a PPOD data repository 75 defined within the memory of the computer. When the buyer initially enters PPOD information into the automated data collection and review system 84, these data are stored in repository 75. The application express engine 77 also implements a messaging system 73, with an attached message routing matrix 71, stored in the memory of the computer. The messaging system monitors responses by the various users of the PPOD system (e.g., buyer, procurement manager, procurement director, commercial analyst, etc.) and issues a message to the next reviewing party once a present PPOD contributing or reviewing party has completed his or her task. The status of this review process is stored, at each step, in data structures: PPOD status 69a and approval status 69b (see also FIG. 9). Thus the messaging system 73 moderates the review process automatically, sending a prompt to the next reviewing party after the prior party has finished his or her action with respect to the PPOD.

Figure 9:
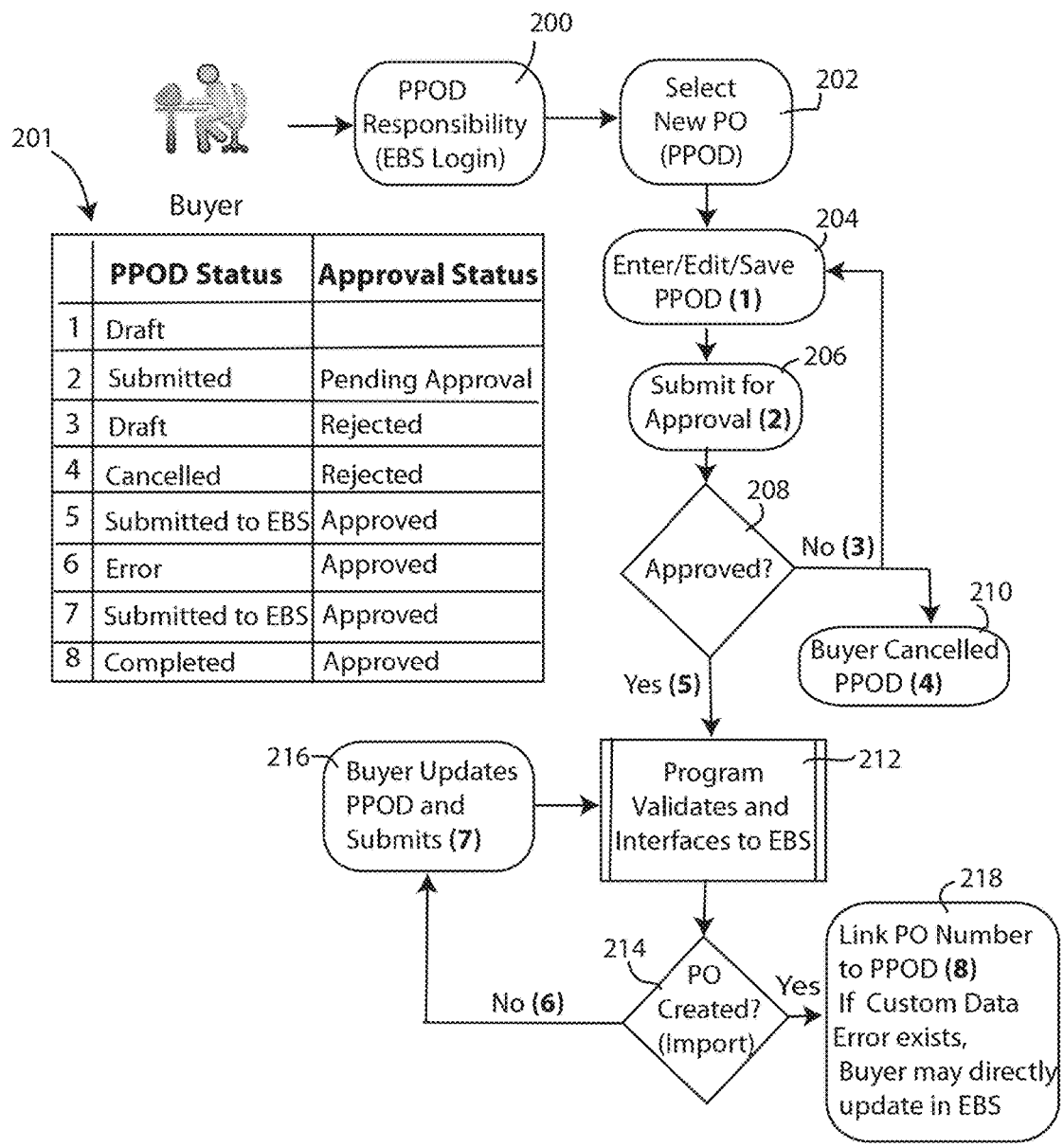
FIG. 9 is a flow diagram showing the process by which a new purchase order (i.e., based on a new PPOD) is created, and specifically showing how the data collection and review system assigns PPOD status and approval status attributes.

FIG. 9 shows the process by which a new purchase order (i.e., based on a new PPOD) is created, In FIG. 9, the PPOD Status and Approval Status attributes have been shown numerically in parentheses, where the numbers correspond to the status key 201. The process begins at step 200, with the buyer logging in to the database 80, which assigns responsibility for the PPOD to that buyer according to his or her database login ID The buyer then selects "New PO" in the dashboard interface screen of the automated data collection and review system 84 (as at 202 in Fig, 9). At this point a new PPOD record is created. The buyer may then fill in the necessary information into the newly created PPOD record. When the buyer selects "Enter / Edit / Save" at this point, the system 84 assigns a "Draft" PPOD status, as at step 204.

Once the buyer is satisfied that all necessary information has been entered into the fields of the dashboard interface screen, he or she selects Submit for Approval, as at step 206. The system 84 then applies the Submitted attribute for the PPOD Status, and also applies the "Pending Approval" attribute for the Approval Status, as indicated at (2).

Once submitted, the PPOD is evaluated by the hierarchy of different approving parties, while the system 84 keeps track. As indicated at step 208, so long as at least one approval is pending, the PPOD is treated as being in the "Draft" PPOD Status, with the Approval Status being indicated as "Rejected," as indicated at (3). While in this state the buyer can elect to cancel the PPOD as at step 210. Doing so changes the PPOD Status to "Cancelled" as indicated at (4).

Once all approvals have been given, the system 84 progresses to the approved state (5) where the PPOD Status is changed to "Submitted to EBS" and the Approval Status is changed to "Approved." In this regard, "Submitted to EBS" indicates that the PPOD is now in process of being submitted for storage in the database 80.

As part of the submission process, the system 84 performs step 212, validating the PPOD data and submitting or interfacing it to the database 80 for storage as a new purchase order. If the purchase order cannot be successfully created, at step 214, due to some error, the PPOD Status is changed to "Error", while the Approval Status remains set as "Approved," as indicated at (6). Thus the buyer is then presented at step 216 with the opportunity to update the PPOD and resubmit. Upon resubmission, the PPOD Status is changed to "Submitted to EBS" as indicated at (7).

On the other hand, if the purchase order can be successfully created at step 214, the system 84 coordinates with database 80 to establish a relational link between the purchase order number (PO Number) and the PPOD number. At this point, the PPOD Status is set to "Completed" and the Approval Status remains set at "Approved," as indicated at (8). As previously discussed, if there happen to be errors in any of the custom information, such custom data error will not prevent the database record from being created in database 80. However, the established link between PPOD number and PO number makes it possible for the buyer to identify the newly created purchase order and make necessary corrections directly within the database 80 as at 218.

Figure 10:
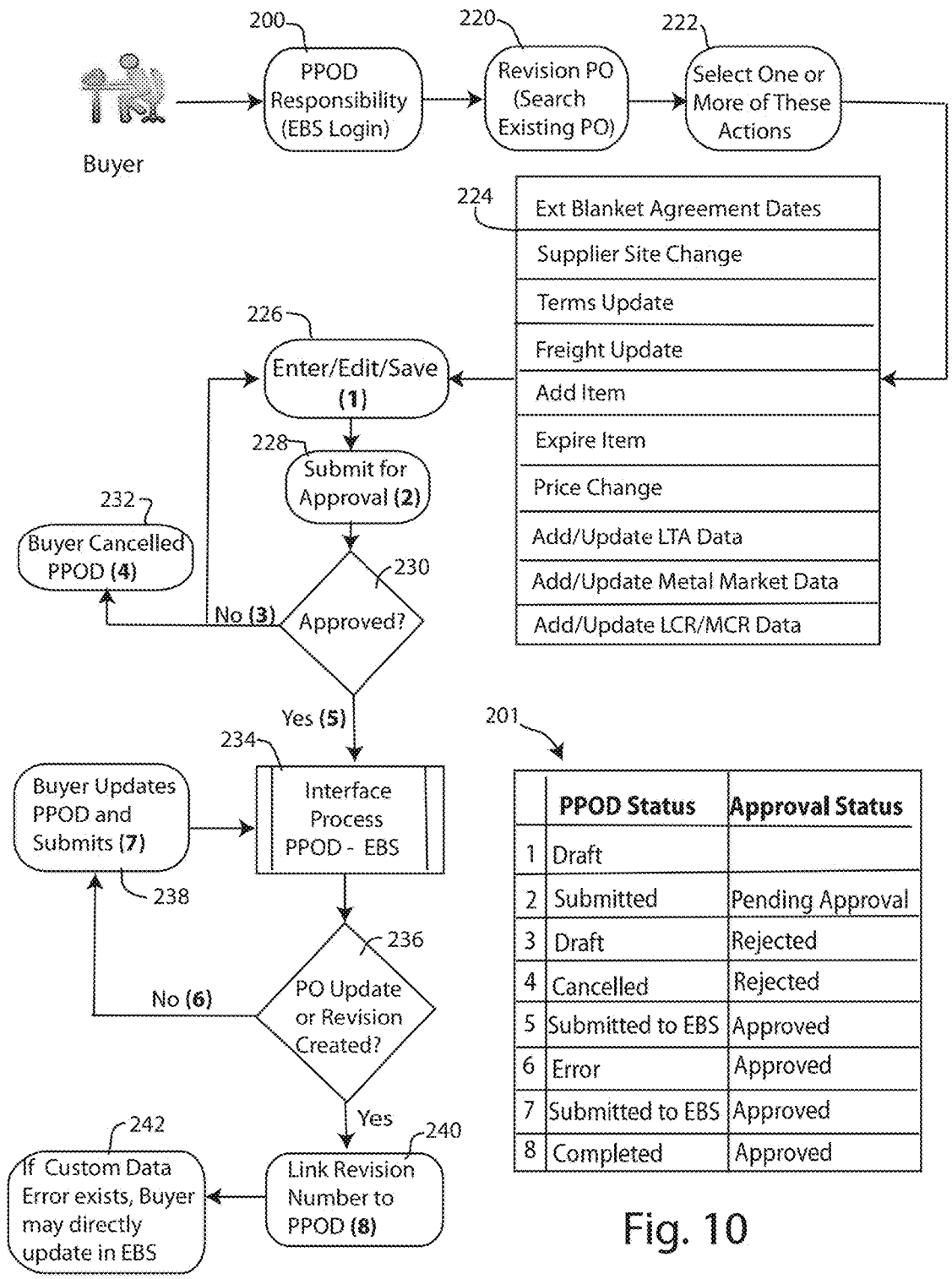
FIG. 10 is a flow diagram showing the process for revising an existing purchase order, and specifically showing how the data collection and review system assigns PPOD status and approval status attributes.

The process for revising an existing purchase order is shown in FIG. 10. As with the process for creating a new purchase order, the buyer first logs into the database 80, which creates a PPOD record in the system 84, associated with that buyer's login ID, as shown at step 200. In this case the buyer chooses to revise a purchase order as at step 220. This is done by conducting a search of the system 84 records to identify an existing purchase order by PO Number. The buyer may then select one or more actions, as at step 222, for which changes are applicable. The available actions are listed at step 224.

When the buyer makes his or her action selections and then performs an Enter/Edit/Save operation, as at step 226, the PPOD Status is set to "Draft," as indicated a (1). When the buyer is happy with all changes entered, he or she submits the PPOD for approval at step 228. This changes the PPOD Status to the "Submitted" state and sets the Approval Status to the "Pending Approval" state. The system 84 then monitors the PPOD as various approvals (or rejections) are registered by the various approving entities.

Once all parties have performed their review, and if at least one rejection has been registered, the system at step 230 maintains the PPOD Status in the "draft" state, and indicates the Approval Status as "Rejected," as indicated at (3). At this stage, the buyer may elect to cancel the PPOD, as at step 232. This causes the system 84 to set the PPOD Status to "Cancelled" and set the Approval Status as "Rejected," as indicated at 4. On the other hand, if all parties have approved at step 230, the system sets the PPOD Status to "Submitted to EBS" and the Approval Status to "Approved" as indicated at (5). This indicates that the PPOD to effect a revision to an existing purchase order is now in process of being submitted for storage in the database 80.

As part of the submission process, the system 84 performs step 234, validating the PPOD data and submitting or interfacing it to the database 80 for storage as an update to an existing purchase order. If the purchase order cannot be successfully updated or the revision created, at step 236, due to some error, the PPOD Status is changed to "Error", while the Approval Status remains set as "Approved," as indicated at (6). Thus the buyer is then presented at step 238 with the opportunity to update the PPOD and resubmit. Upon resubmission, the PPOD Status is changed to "Submitted to EBS" as indicated at (7).

On the other hand, if the purchase order can be successfully created at step 236, the system 84 coordinates with database 80 to revise the relational link between the purchase order number (PO Number) and the PPOD number. At this point, the PPOD Status is set to "Completed" and the Approval Status remains set at "Approved, as indicated at (8). As previously discussed, if there happen to be errors in any of the custom information, such custom data error will not prevent the database record from being created in database 80. However, the established link between PPOD number and PO number makes it possible for the buyer to identify the newly created purchase order and make necessary corrections directly within the database 80 as at step 242.

Figure 11:
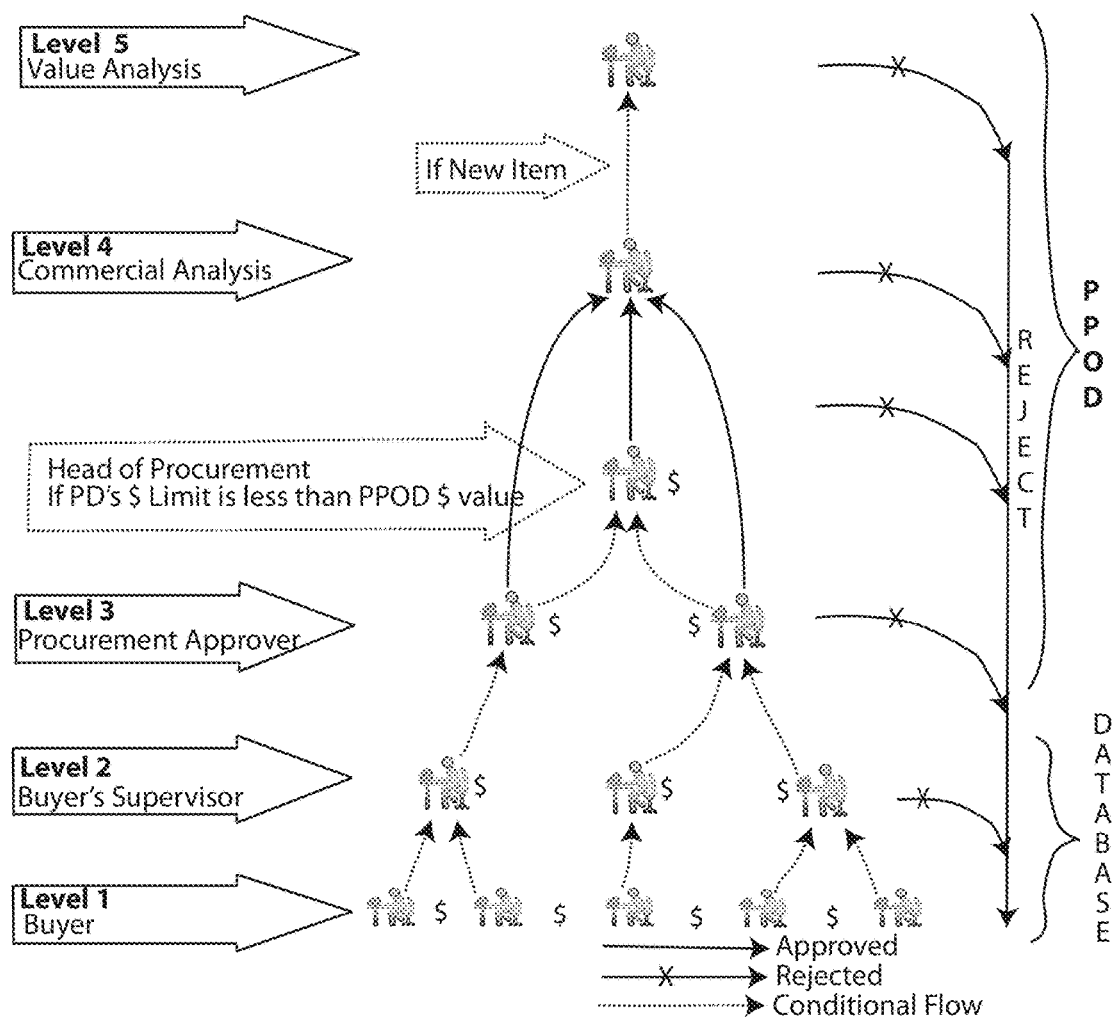
FIG. 11 is a process flow diagram useful in understanding how the PPOD is routed by the data collection and review system based on the routing matrix of FIG. 7.

The automated data collection and review system 84 implements a hierarchical approval flow process that is illustrated in FIG. 11. The approval flow is mediated by the system 84, which sends approval notifications which contain a link to the PPOD information. In an environment based on the ORACLE® EBusiness Suite, the approval notifications may be implemented to display in the standard notifications window within the ORACLE® environment. Other database systems provide similar notification capability and may alternatively be used.

As shown in FIG. 11, the approvals are assigned to different tiers or levels, where each level is allocated to a different approval function within the business. The hierarchical arrangement shown in FIG. 11 is exemplary. Different businesses may set up different approval flow arrangements as will be appreciated. FIG. 11 also depicts that process flows may have different attributes associated with them, indicating for example the approval status (shown in FIG. 10). Thus in FIG. 11 some of the flows have been associated with an "approved" attribute; others are associated with a "rejected" attribute. Still other flows are designated as "conditional flow," indicating that the flow is still pending approval.

The buyers are allocated to Level 1. Buyers create the initial PPOD records in the system 84 and this record creation establishes the buyer as the "owner" of that PPOD record. Ownership can be changed from one buyer to another by the administrator of the system 84. The buyer's supervisor is allocated to Level 2. Thus the system 84 notifies the buyer's supervisor that a PPOD has been created and needs the buyer's supervisor's approval, if such is the case. The procurement approver is allocated to Level 3 which lies above Level 2. The procurement approver thus provides approvals after the PPOD has been approved by the buyer's supervisor at Level 2. Similarly, the commercial analyst is allocated to Level 4 and the value analyst is allocated to Level 5. These levels review approval decisions from the immediately lower level.

In the exemplary implementation, the conditional flow is based on the dollar amount associated with the PPOD or otherwise based on the impact the PPOD will have upon the company. For example, a buyer may have a $10,000 approval limit; the buyer's supervisor may have a $100,000 or $200,000 limit and the procurement approver may have up to a $2.5 million limit, and so forth. Thus as shown in FIG. 11, upon creation of the PPOD record the system generates approval notifications, designated as "conditional flow" notifications to Level 2. The flow is designated as a "conditional flow" to indicate that final approval may potentially still be pending, depending on the dollar amount associated with the PPOD. If the dollar amount is $100,000, for example, the flow will proceed from the buyer to the buyer's supervisor but would not need to be routed higher.

Figure 12:
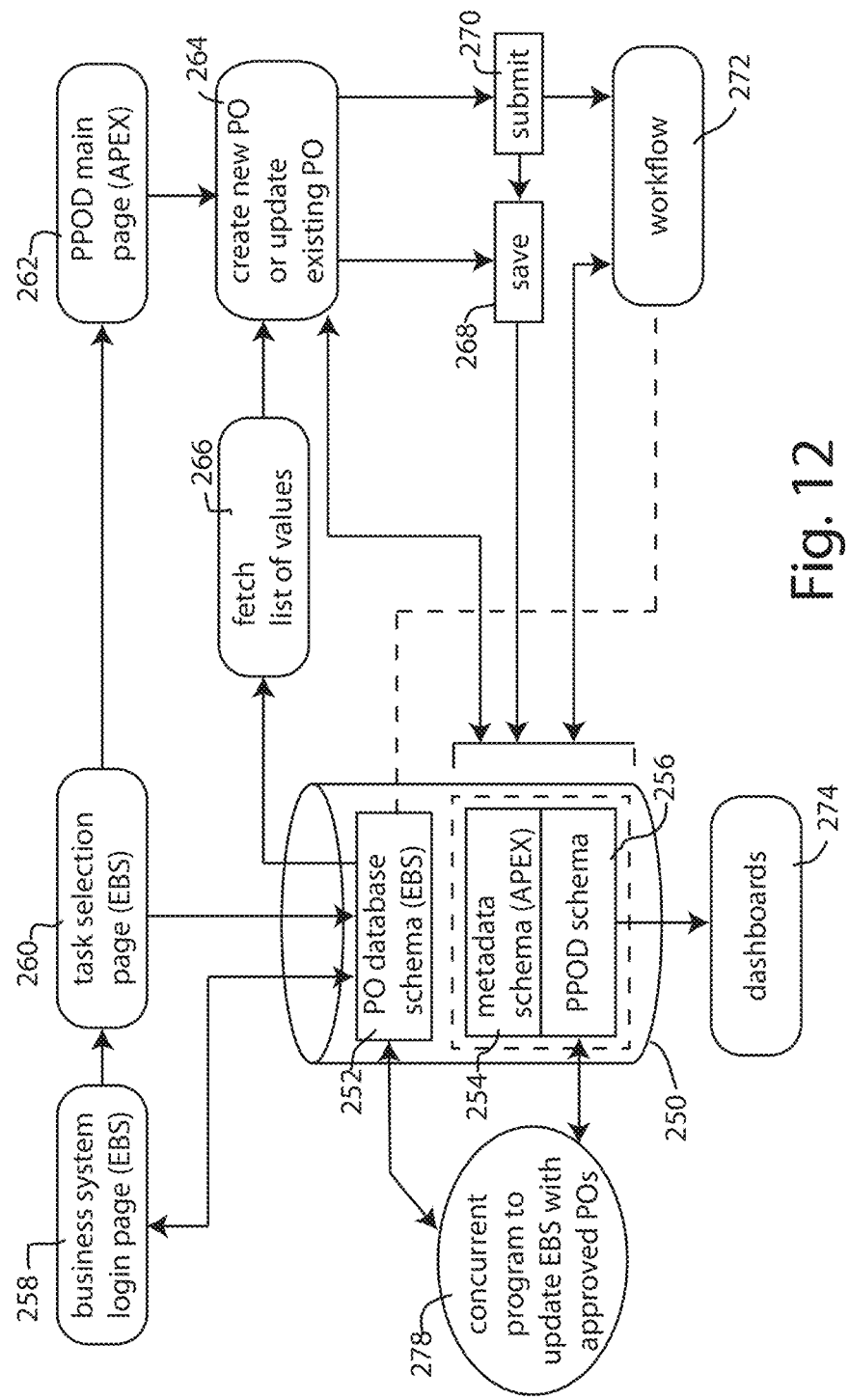
FIG. 12 is an overview system diagram, depicting how the data collection and review system is integrated into an exemplary embodiment with a purchased part order database.

Referring to FIG. 12, the high level architecture of a business system incorporating the data collection and review system has been illustrated. For the illustrated embodiment the business system has been implemented using an ORACLE® database management system, including the E-Business Suite (EBS) technology and further including the ORACLE® Application Express (APEX) technology to supports web-based interaction with the business system.

The business system includes a database management system with associated data stores, depicted generally at 250. The data stores are configured according to predefined data structures and schema, namely a part purchase order database schema 252 that stores purchase order data. This portion of the database management system may be implemented using EBS technology, for example. In addition, the predefined data structures and schema further include a metadata schema that is used to support the internal operation of the data collection and review system. The metadata schema stores, for example the assigned attributes and metadata used to mediate information flow that was illustrated in FIG. 11. Finally, the predefined data structures and schema include the PPOD schema by which the PPOD information submitted for approval by the buyer is stored and organized. If desired, schemas 254 and 256 may be implemented using the APEX technology and are thus part of the web-based interaction system.

In use, the user first logs into the underlying business system as at 258. At this point the user is primarily interacting with the EBS system. Once authenticated to the system, the user is presented with a task selection page 260, also preferably implemented with the EBS system, which gives the user the option to interact with the data collection and review system of the present disclosure. Upon making this selection the user is logged onto the PPOD main page, which is preferably implemented using the APEX technology and is thus preferably supports web-based interaction. User authentication between the EBS and the APEX systems may be performed automatically, using predefined "authorization schemes" defined at the APEX level relating access in the APEX system to the responsibilities of the user at the EBS level.

Upon opening the PPOD page 262 the user is given the option, shown at 264, to create a new purchase order or update an existing purchase order. In both instances a PPOD record is generated, representing the information the user wishes to add to the purchase order database.

The APEX system sends a request to the EBS system, to fetch a list of values needed for the PROD, as at 266. All of the available data in the EBS part database schema 252 needed to be entered in the PROD screen are fetched using SQL® queries under list of values of the respective fields on the PROD page.

The user then fills in any required details in the PPOD page, whereupon the user can select either "save," as at 268, or "submit," as at 270. If the user "saves" the PPOD, the data are updated in the PPOD schema 256, after proper validations. No workflow is initiated. If the user elects to "submit" the PPOD, the data are first saved in the PPOD schema 256, after proper validations, and an entry is made into a Lifecycle table for the PPOD in the PPOD schema. In addition, a custom workflow is initiated, as at 272. The workflow may be implemented as part of the EBS technology, as indicated by the dashed line connecting workflow 272 with schema 252 in FIG. 12.

The custom workflow 272 fetches the details of the Approvers list, based on the approval matrix stored in the custom table or custom process, or stored in another suitable location. Then based on the approval limits (e.g. dollar amount associated with the PPOD), notifications are sent to the different approvers in the hierarchy. This workflow continues to operate until the PPOD is finally approved or rejected. At every stage of approval, the status of the PPOD is updated in the PPOD schema 256 and published on the PPOD page. In the presently preferred embodiment the system also includes a dashboard 274 which shows the status and details of all PPODs by fetching the appropriate data from the PPOD schema 256.

Once the PPOD has been finally approved, the information pertaining to that PPOD data are populated in the part purchase order schema 252. The data is inserted into the EBS data system via interface tables. This is shown generally at 278. If the interface table fails, then that status will be reflected in the PPOD and in turn displayed in the dashboard 274.

After successful population of the PPOD data into the interface tables of the EBS system, standard ORACLE® programs are used to import the data from the interface tables into the base tables of the EBS system in an "approved" status. These import programs may comprise, for example: import standard purchase orders; and import price catalogs (per a blanket purchase agreement).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented purchased part order data management system, comprising:
   a database management computer hosting a purchased part order database;
   an automated data collection and review computer having a purchased part order data (PPOD) repository and having a computer-implemented messaging system including a message routing data structure;
   the automated data collection and review computer being coupled to said database management computer to support data transfer from the automated data collection and review computer to the database management computer through an iterative validating interface that automatically tests data transferred to the database management computer for conformance and that uses the messaging system to issue prompts requesting correction when data transferred to the database management computer is nonconforming based on the automatic testing by the iterative validating interface;
   the automated data collection and review computer having an interface supporting interaction with the data repository and with the messaging system by a PPOD creating user and by a plurality of different PPOD reviewing users;
   the messaging system having populated in said message routing data structure the identity of different PPOD reviewing users according to a predefined reviewing sequence;
   the messaging system automatically monitoring interaction by said PPOD creating user and by said PPOD reviewing users and issuing prompts to PPOD reviewing users based on the predefined reviewing sequence, the prompts to PPOD reviewing users including referential link to a record in the PPOD repository;
   the messaging system automatically issuing a prompt to said database management computer to ingest information based on the PPOD data subject to having been found conforming by the iterative validating interface when, based on the predefined reviewing sequence, all pending reviews have been completed with approval.

2. The computer-implemented purchased part order data management system of claim 1 wherein the computer-implemented messaging system includes a data structure to store at least one review status reflecting the PPOD at each stage in the review process.

3. The computer-implemented purchased part order data management system of claim 1 wherein the computer-implemented messaging system includes a PPOD status data structure populated by the messaging system to reflect the status of the PPOD at each stage of review.

4. The computer-implemented purchased part order data management system of claim 3 wherein the PPOD status data structure is mediated by the messaging system to accept PPOD status data values selected from the group consisting of: draft, submitted, submitted to the database management computer, cancelled, completed and error.

5. The computer-implemented purchased part order data management system of claim 1 wherein the computer-implemented messaging system includes an approval status data structure populated by the messaging system to reflect the approval status of the PPOD at each stage of review.

6. The computer-implemented purchased part order data management system of claim 5 wherein the approval status data structure is mediated by the messaging system to accept approval status data values selected from the group consisting of: pending approval, approved and rejected.

7. The computer-implemented purchased part order data management system of claim 1 further comprising an HTTP protocol server coupled to the automated data collection and review computer which interfaces with a user computer via a browser running on the user computer.

8. The computer-implemented purchased part order data management system of claim 1 wherein the database management computer and the computer-implemented messaging system are implemented on the same computer and share a common processor.

9. The computer-implemented purchased part order data management system of claim 1 wherein the database management computer and the computer-implemented messaging system are implemented on the separate computers networked together.

10. A method of processing purchased part order data, comprising:
    using an automated data collection and review computer to receive PPOD data from a first user;
    using said automated data collection and review computer to store the received PPOD data in memory associated with said automated data collection and review computer;
    using said automated data collection and review computer to maintain a status of the PPOD data in a data structure administered by said automated data collection and review computer;
    using said automated data collection and review computer to dispatch a message to a second user, providing said second user with a link by which to access said stored PPOD data;
    using said automated data collection and review computer to update the status of the PPOD data in response to access of the stored PPOD data by the second user;
    using said automated data collection and review computer to automatically communicate with a database management computer through an iterative validating interface that automatically tests data transferred to the database management computer for conformance and dispatches messages to issue prompts requesting correction when data transferred to the database management computer is nonconforming based on the automatic testing by the iterative validating interface and based on the updated status of the PPOD data in said data structure, causing the database management computer to ingest said PPOD data into the database management computer.

11. The method of claim 10 wherein the status of the PPOD data corresponds to PPOD status data values selected from the group consisting of: draft, submitted, submitted to the database management computer, cancelled, completed and error.

12. The method of claim 10 wherein the status of the PPOD data corresponds to approval status data values selected from the group consisting of: pending approval, approved and rejected.

13. The method of claim 10 wherein said automated data collection and review computer communicates with at least one of said first and second users using an HTTP protocol server coupled to the automated data collection and review computer and communicating with said at least one of said first and second users via a browser running on a user computer.

14. The method of claim 10 further comprising:
using said automated data collection and review computer to dispatch a message to a third user, providing said third user with a link by which to access said stored PPOD data in response to completion of review by said second user.

15. A non-transitory computer-readable medium encoded with a program for causing an automated data collection and review computer to:
receive PPOD data from a first user;
to store the received PPOD data in memory associated with said automated data collection and review computer;
to maintain a status of the PPOD data in a data structure administered by said automated data collection and review computer;
to dispatch a message to a second user, providing said second user with a link by which to access said stored PPOD data;
to update the status of the PPOD data in response to access of the stored PPOD data by the second user; and
to automatically communicate with a database management computer through an iterative validating interface that automatically tests data transferred to the database management computer for conformance and dispatches messages to issue prompts requesting correction when data transferred to the database management computer is nonconforming based on the automatic testing by the iterative validating interface and based on the updated status of the PPOD data in said data structure, causing the database management computer to ingest said PPOD data into the database management computer.

16. The non-transitory computer-readable medium according to claim 15 encoded with a program for further causing said automated data collection and review computer to dispatch a message to a third user, providing said third user with a link by which to access said stored PPOD data in response to completion of review by said second user.

17. The non-transitory computer-readable medium according to claim 15 wherein the status of the PPOD data corresponds to PPOD status data values selected from the group consisting of: draft, submitted, submitted to the database management computer, cancelled, completed and error.

18. The non-transitory computer-readable medium according to claim 15 wherein the status of the PPOD data corresponds to PPOD status data values selected from the group consisting of: pending approval, approved and rejected.

19. The computer-implemented purchased part order data management system according to claim 1 further comprising an interface between the database management computer and the automated data collection and review computer programmed to support bifurcated data validation in which a first class of information is processed by the iterative validating interface and a second class of information is input from the automated data collection and review computer into the database management computer without being processed by the iterative validating interface.

20. The method of processing purchased part order data according to claim 10 further comprising providing a bifurcated data validation process by defining a first class of information that is communicated through the iterative validating interface and a second class of information that is communicated from the automated data collection and review computer into said database management computer without being communicated through the iterative validating interface.

* * * * *

UNITED STATES PATENT AND TRADEMARK OFFICE
CERTIFICATE OF CORRECTION

PATENT NO. : 10,346,898 B2
APPLICATION NO. : 14/062126
DATED : July 9, 2019
INVENTOR(S) : Ronaldo Bittencourt Cirihal It is certified that error appears in the above-identified patent and that said Letters Patent is hereby corrected as shown below:

In the Specification

In Column 8, Description of Preferred Embodiments, Line 49, delete "PROD" and insert --PPOD-- therefor.

In Column 9, Description of Preferred Embodiments, Line 14, delete "created," and insert --created.-- therefor.

In Column 9, Description of Preferred Embodiments, Line 20, after "ID", insert --.-- therefor.

In Column 9, Description of Preferred Embodiments, Line 22, delete "Fig," and insert --Fig.-- therefor.

In Column 12, Description of Preferred Embodiments, Line 29, delete "PROD," and insert --PPOD,-- therefor.

In Column 12, Description of Preferred Embodiments, Line 31, delete "PROD" and insert --PPOD-- therefor.

In Column 12, Description of Preferred Embodiments, Line 33, delete "PROD" and insert --PPOD-- therefor.

Signed and Sealed this
Twenty-seventh Day of August, 2019

Andrei Iancu
*Director of the United States Patent and Trademark Office*